Patented May 2, 1939

2,157,083

UNITED STATES PATENT OFFICE 2,157,083

PREPARATION OF CELLULOSE ETHERS

Floyd C. Peterson, Syracuse, N. Y., and Arthur J. Barry, Midland, Mich., assignors to The Dow Chemical Company, Midland, Mich., a corporation of Michigan No Drawing. Application January 29, 1938, Serial No. 187,655

18 Claims. (Cl. 260—231)

This invention relates to a process for the preparation of cellulose ethers and especially to such a process carried out in the presence of anhydrous liquid ammonia.

In the customary methods for the preparation of cellulose ethers, cellulose is treated with sodium hydroxide or equivalent alkali, either in the form of a concentrated aqueous solution or by mixing the cellulose with solid sodium hydroxide in the presence of insufficient water to dissolve all of the alkali. The alkali cellulose is usually pressed to remove some of the excess alkali solution, or it may be aged without any squeezing step having been employed. In all such processes there is left a substantial molecular excess of alkali. The alkali cellulose product so formed is subjected to the action of an etherifying agent such as an alkyl halide, alkyl sulphate, aralkyl halide, other inorganic esters of alkyl or aralkyl alcohols, or the like, preferably at elevated temperatures, usually in the range from about 90° to 120° C., and for periods of time varying from 6 to 24 hours or longer. The amount of etherifying agent employed is usually far in excess of the theoretical amount necessary to react with the alkali in the alkali cellulose. Such processes, then, result necessarily in the formation of inordinately large quantities of undesirable byproducts formed by the side reaction between the excess alkali present and the etherifying agent. Such by-products are usually alcohols or ethers which are not adapted to further employment as etherifying agents. It is well known that, as the water content of the alkali cellulose is reduced, the efficiency of the alkylating agent is increased. The schemes of the prior art, however, lead to non-uniformly etherified celluloses, which dissolve incompletely in solvents to form highly gelatinous solutions.

It is an object of the present invention to provide a process whereby cellulose ethers may be prepared from alkali metal cellulosates in liquid ammonia as the reaction medium. It is a further object to provide a process whereby substantially anhydrous alkali metal cellulosates may be prepared from approximately stoichiometrical proportions of alkali metal and cellulose or partially etherified cellulose, and from which poly-substituted cellulose ethers may be derived without excessive conversion of etherifying agents into undesirable by-products.

It was shown by Schmid and others, Berichte 58, p. 1966 (1925) and Monatshefte 94, p. 107 (1928), that poly-alcohols, such as glycol, glycerine, glucose, glycogen, inulin, and starch, reacted readily in liquid ammonia with metallic sodium to give exclusively a mono-metallic derivative. These workers found that if a higher substituted metallic derivative were formed in the process, the product was badly discolored and very unstable, burning spontaneously when exposed to air and containing up to 5 per cent of nitrogen. Such products when washed with further quantities of ammonia, retained only an amount of metal corresponding to a mono-substitution product.

Scherer and Hussey, J. A. C. S. 53, p. 2344 (1931), showed that when cellulose was allowed to react with an excess of sodium in liquid ammonia, a tri-sodium cellulosate was formed. This was proven on the basis of the yield of hydrogen evolved from the reaction.

Muskat, J. A. C. S. 56, pp. 693 and 2449 (1934), reported, contrary to the findings of Schmid, that potassium in liquid ammonia reacts completely with all available hydroxyl groups of the simple sugars and their substitution products. He showed, further, that complete alkylation of the sugars could be effected by treatment of these metallic derivatives with a slight excess of an alkyl halide.

Schorigin et al., Berichte 69, p. 1713 (1936), reacted sodium and cellulose in liquid ammonia and found all of the available hydroxyl groups to take place in the reaction. The reaction proceeded slowly, however, and is reported as being continuous rather than step-wise, indicating that there is no preferential action between the metallic sodium and any particular hydroxyl group. These workers report, further, that on attempting to methylate tri-sodium cellulosate, they could obtain only a mono-methyl derivative, soluble in cold water, and having a methoxyl content between 15 and 16 per cent. This material, on hydrolysis, yielded a mixture of glucose and various lower methylated glucoses.

In 1937 there was issued British Patent No. 463,056 which treats primarily of the reaction between cellulose or alkali cellulose, metallic sodium, and water in the presence of liquid ammonia. Example 3 of this patent shows the preparation of a sodium cellulosate by the interaction of cellulose and metallic sodium in liquid ammonia without any added aqueous medium.

We have now found that when vacuum-dried or otherwise prepared substantially anhydrous cellulose is suspended in liquid ammonia and treated with an alkali metal, preferably metallic sodium, and especially when such treatment is carried out in the presence of a liquid hydrocarbon which is inert to the cellulose and liquid ammonia and substantially inert to the action of sodium, there is readily produced an alkali metal cellulosate. The reaction between the alkali metal and the cellulose is substantially quantitative, as indicated by the hydrogen evolved from the substitution reaction. No excess alkali metal is required. A material having an analysis equivalent to that of a tri-metallic cellulosate may be produced by reacting cellulose with 3 molecular proportions of an alkali metal in liquid ammonia medium, the cellulose molecule being calculated on the basis of the unit formula $C_6H_{10}O_5$. By suitable variation of the amount of alkali metal, mono- or di-metallic cellulosates may be prepared. The reaction between the alkali metal and cellulose is conducted at any temperature below the boiling point of liquid ammonia at the pressure (1 to 10 atmospheres) employed, e. g., below —33° C. at atmospheric pressure and up to about 25° C. at 10 atmospheres. We have carried out the reaction at temperatures as low as —80° C. at atmospheric pressure and find it to work satisfactorily. Higher temperatures, e. g., —20° to +20° C., may be employed by application of super-atmospheric pressure. Ammonia at temperatures of about —20° C. causes greater swelling of the cellulose than at —33° C. and should give the sodium a better chance to enter the fiber and react with all hydroxyl groups. When the initial blue color of the solution, caused by the presence of metallic sodium dissolved in the ammonia, has all disappeared, the reaction is known to be complete. This may require from 2 to 50 hours. The alkali metal cellulosate is not isolated at this stage, nor is it entirely freed from ammonia. The etherifying agent, in amount varying from 1 to 10, and ordinarily about 6 equivalents per atom of alkali metal, is added directly to the liquid ammonia suspension of the alkali metal cellulosate, which is then allowed to stand until the etherification reaction has ceased. This requires ordinarily from 3 to 20 hours or more, (occasionally as much as 70 hours), depending upon the etherifying agent employed, the temperature of the reaction, and the number of atoms of alkali metal substituted in the cellulose molecule. We prefer to carry out this stage of the reaction while the liquid ammonia is being allowed to volatilize slowly away from the reaction mixture. Thus, when etherification starts, the temperature may be at or below 0° C. and, correspondingly, the pressure may be 5 atmospheres or less, and when etherification is complete the temperature of the reaction mixture may have risen to approximately room temperature, i. e. about 25° C., and the pressure is atmospheric.

We have found that, owing to the low temperature employed in the etherification, side reactions between ammonia or sodium and the etherifying agent are reduced to a minimum. For example, when ethyl bromide is employed as the etherifying agent, no appreciable amount of ethylene, butane, or ethyl amine was detected in the gases escaping from the reaction mixture.

After reaction is complete and the mixture has finally attained room temperature, the cellulose ether may be recovered according to any one of several methods. One satisfactory procedure is to discharge the reaction mixture into boiling water while the mixture is still slightly alkaline, thus flashing off unreacted etherifying agent if this material has a boiling point below that of water, as well as volatilizing any small amount of amine which may have been formed as a byproduct, and steam-distilling from the mixture any hydrocarbon which may have been employed as a suspension medium throughout the reaction. Another procedure whereby we recover the cellulose ether involves shaking the material with a cellulose ether solvent, such as a mixture of 67 parts of benzene and 33 parts of methanol, by volume, filtering the mixture to remove most of the salt formed during the reaction and any suspended partially or wholly unetherified cellulose which may remain therein. The clear filtrate may be worked up according to well known procedures.

Various preferred methods of carrying out our invention may be best illustrated by means of examples.

*Example 1*

180 milliliters of anhydrous toluene, 12.9 grams sodium (equivalent to 3 atoms per cellulose unit, $C_6H_{10}O_5$), and 30.0 grams of anhydrous, finely divided cellulose were placed in a reaction vessel of 1500 milliliter capacity, equipped with means for mechanical agitation and capable of being tightly sealed. The reactor was sealed and cooled to below —40° C., after which approximately 1 liter of anhydrous ammonia was admitted to the vessel through a delivery tube provided for that purpose. The temperature of the mixture was maintained below —33° C., while the mixture was constantly stirred until substantially all of the sodium had reacted, as ascertained both by measurement of the hydrogen evolved, and by disappearance of the characteristic blue color of sodium in liquid ammonia. In this example, the time allowed for this step in the reaction was 50 hours. Most of the liquid ammonia was distilled from the vessel until only about 25 milliliters remained. This was just sufficient to keep the sodium cellulosate moistened with ammonia. The reaction vessel was cooled to below —33° C., 350 grams (5.7 moles per atom of sodium) of ethyl bromide was added to the cooled mixture and agitation was continued for about 48 hours. During the progress of the reaction, the temperature was allowed to rise slowly to ordinary room temperature. The reaction mixture was discharged into hot water, thereby flashing off residual ethyl bromide and steam distilling the toluene which had been employed as a dispersion medium. Salts formed during the reaction readily dissolved in the water, leaving the crude ethyl cellulose as a white, porous, granular material. The ethyl cellulose was dissolved in a 67:33 volume mixture of benzene:methanol, filtered, and again poured into boiling water whereby there was precipitated a white ethyl cellulose which was insoluble in cold water and soluble in the usual organic solvents for such materials. The ethoxyl content of the ethyl cellulose was about 41 per cent, i. e., about 2 ethoxyl groups were introduced for each $C_6H_{10}O_5$ unit. The amount of purified ethyl cellulose recovered represented a yield of about 82 per cent, based on the weight of the initial charge of cellulose.

By way of contrast, when all the ammonia was removed from a sodium cellulosate prior to etherification, other conditions being the same as those above, the product had an ethoxyl content of only 1.93 per cent. The product was degraded, very dark, and was obtained in low yield.

*Example 2*

In a manner analogous to that described above, 5 parts by weight of cellulose was suspended in 25 parts of anhydrous toluene and mixed with 70 parts of liquid ammonia. To this mixture was added 1.45 parts of sodium, equivalent to 2 atoms of sodium for each $C_6H_{10}O_5$ unit. After 2 hours, the characteristic blue color of sodium had disappeared and most of the anhydrous ammonia was allowed to distill from the reaction vessel, enough being retained to keep the sodium cellulosate moist. The vessel was cooled to below −33° C., and 57 parts of ethyl bromide were added to the mixture, which was then allowed to stand for 20 hours while the reaction temperature was allowed to rise gradually to about 25° C. The ethyl cellulose was recovered in a manner similar to that employed in the preceding example and was obtained in a yield of approximately 98 per cent. The product was a white, porous, granular material having an ethoxyl content of about 30 per cent.

*Example 3*

In a similar manner, 5 parts of anhydrous cellulose was suspended in 150 parts of anhydrous ammonia and 20 parts of anhydrous toluene, and was treated with 2.16 parts of metallic sodium. The mixture was allowed to stand overnight, by which time the sodium cellulosate reaction had all taken place. 86 parts of ethyl bromide was added, corresponding molecularly to 8.4 parts ethyl bromide per atom of sodium. The ammonia was allowed to boil slowly from the mixture over a period of 20 hours, during which time the cellulose derivative settled to the bottom of the reactor. Ethyl cellulose was recovered, in the manner previously described, in approximately quantitative yield, as a porous, granular product containing 33.6 per cent ethoxyl groups.

*Example 4*

2.6 parts by weight of an ethyl cellulose, prepared in the manner described in the preceding examples, and containing 33.3 per cent ethoxyl groups, was suspended in 35 parts of toluene and 100 parts of anhydrous liquid ammonia. To this suspension was added 0.44 part of metallic sodium, stoichiometrically equivalent to the remaining unsubstituted hydroxyl groups in the partially etherified cellulose. The sodium was consumed in about 2 hours, after which the ammonia was distilled slowly from the reaction vessel until about 7 parts of ammonia remained. The mixture was again cooled to below −33° C. while 17 parts by weight (8 molecular proportions based on the amount of sodium employed) of ethyl bromide was added. The temperature was allowed to rise to about 25° C. over a period of about 20 hours. The ethyl cellulose was recovered in the manner described in Example 1. The yield of ethyl cellulose was better than 80 per cent, and the ethoxyl content of this product was about 49 per cent. Such a material is comparable in all respects to the best grades of highly soluble ethyl cellulose employed in film-forming operations and in the preparation of lacquers and similar coating compositions.

*Example 5*

A di-sodium cellulosate prepared in the amount and manner set forth in Example 2 was treated with 47 parts by weight (6 molecular proportions based on the amount of sodium employed) of benzyl chloride. The temperature of the reaction mixture was allowed to rise in the manner previously described from a point below −33° C. to about 25° C. over a period of 20 hours. The crude benzyl cellulose, recovered in approximately quantitative yield, by precipitation in boiling water in the manner set forth in Example 1, contained 53.9 per cent benzoxyl groups. By purification of the crude product with organic solvents and precipitation thereof in hot water, a benzyl ether of cellulose was obtained having a benzoxyl content of about 63 per cent. This corresponds to 2.0 benzoxyl groups per glucose unit.

The invention has been illustrated with respect to the use of sodium as the alkali metal from which the metal cellulosates are prepared. Other alkali metals, e. g., potassium and lithium, may be similarly employed. We have found that potassium reacts nearly as rapidly as does sodium, and that while lithium will react to form a satisfactory lithium cellulosate which may be employed for etherification purposes, this reaction is relatively slow.

In each of the examples wherein a hydrocarbon was employed as a dispersing agent, we have shown the use of toluene. A large series of runs have been made wherein other hydrocarbons were employed. We have found, for example, that such alkyl-substituted aromatic hydrocarbons as toluene, xylene, ethyl benzene, cymene, and the like, may be utilized as the hydrocarbon dispersion agent throughout the reaction. The use of such hydrocarbon liquids facilitates the reaction between the alkali metal and the cellulose in liquid ammonia, even though the hydrocarbon and the ammonia are immiscible. We have as yet no wholly satisfactory explanation of the mechanism involved in the reaction. Such hydrocarbons appear, however, to exert a catalytic effect upon the reaction between the alkali metal and the cellulose. These hydrocarbons serve further to assist in the etherification reaction after the alkali metal cellulosate has been prepared. It is our theory and appears reasonable to presume that the etherification of the metal cellulosate occurs initially as a surface phenomenon. The aromatic hydrocarbons, being swelling agents for partially etherified cellulose and solvents for the higher etherification products, either swell the fiber, on the surface of which initial etherification has occurred, or dissolve therefrom such of the ether product as is sufficiently substituted to be readily soluble. This allows the etherifying agent to have access to the rest of the cellulosate fiber and results ultimately in the production of an etherified product having nearly as high a degree of substitution in the molecule as would be expected from the amount of alkali metal originally employed in the preparation of the cellulosate being etherified.

The etherifying agents shown in the examples are ethyl bromide and benzyl chloride. We have similarly employed ethyl chloride, methyl bromide, methyl iodide, ethyl iodide, normal propyl chloride, normal butyl chloride, diethyl sulphate, dimethyl sulphate, and similar inorganic esters of alkyl and aralkyl alcohols as etherifying agents. The reaction did not progress to the same extent in the case of each of the etherifying agents, but in every instance there was indication of considerable etherification reaction. Other etherifying agents which may be employed include, for example, substitution products of those previously named, containing nitro, nitroso, amino or other groups substantially inert to ammonia and the alkali metals at the temperature employed.

The examples have shown the application of our process to the preparation of cellulose ethers, each containing a single type of substituent group. Mixed cellulose ethers, wherein the cellulose molecule contains 2 or more different etherifying groups, may be prepared by the stepwise process set forth in Example 4. Thus, instead of employing an additional quantity of ethyl bromide, as in that example, if benzyl chloride or methyl iodide be used as the etherifying agent in the second step, the cellulose ether product is ethyl benzyl cellulose, or ethyl methyl cellulose, respectively.

Instead of distilling or evaporating a large proportion of the ammonia from the reaction prior to the addition of the etherifying agent, all of the ammonia may be left therein. Such a process tends to produce more by-product, by interaction of ammonia and the etherifying agent, and a slightly lower yield of cellulose ether, than does the one shown in the examples. If, however, the temperature of etherification is maintained through the initial stages of the reaction below about −50° C., the formation of by-products, such as amines, is minimized.

Other modes of applying the principle of our invention may be employed instead of those explained, change being made as regards the method and materials herein disclosed, provided the step or reactants stated by any of the following claims, or the equivalent of such stated steps or reactants, be employed.

We therefore particularly point out and distinctly claim as our invention:

1. The process which comprises reacting substantially anhydrous cellulose with an alkali metal in a medium comprising anhydrous liquid ammonia and a liquid hydrocarbon which is inert to the cellulose and liquid ammonia and substantially inert to the action of the alkali metal.

2. The process which comprises reacting substantially anhydrous cellulose with an alkali metal in a medium comprising anhydrous liquid ammonia and a liquid aromatic hydrocarbon.

3. The process which comprises reacting substantially anhydrous cellulose with an alkali metal in a medium comprising anhydrous liquid ammonia and a liquid alkyl substituted aromatic hydrocarbon.

4. The process which comprises reacting substantially anhydrous cellulose with an alkali metal in a medium comprising anhydrous liquid ammonia and toluene.

5. The process which comprises reacting substantially anhydrous cellulose with between about 1 and about 3 atoms of an alkali metal, per glucose unit in the cellulose, in a medium comprising anhydrous liquid ammonia and a liquid hydrocarbon which is inert to the cellulose and liquid ammonia, and substantially inert to the action of the alkali metal.

6. The process which comprises reacting substantially anhydrous cellulose with between about 1 and about 3 atoms of an alkali metal, per glucose unit in the cellulose, in a medium comprising anhydrous liquid ammonia and a liquid aromatic hydrocarbon which is inert to the cellulose and liquid ammonia and substantially inert to the action of the alkali metal.

7. The process which comprises reacting substantially anhydrous cellulose with between about 1 and about 3 atoms of an alkali metal, per glucose unit in the cellulose, in a medium comprising liquid ammonia and toluene.

8. The process which comprises reacting substantially anhydrous cellulose with an alkali metal in a medium comprising anhydrous liquid ammonia and a liquid hydrocarbon which is inert to the cellulose and liquid ammonia and substantially inert to the action of the alkali metal, at a temperature below the boiling point of the anhydrous ammonia under the pressure employed, said pressure being in the range from 1 to 10 atmospheres.

9. The process which comprises reacting substantially anhydrous cellulose with an alkali metal in a medium comprising anhydrous liquid ammonia and toluene at a temperature below the boiling point of the anhydrous ammonia under the pressure employed, said pressure being in the range from 1 to 10 atmospheres.

10. The process which comprises reacting substantially anhydrous cellulose with an alkali metal in a medium comprising anhydrous liquid ammonia and toluene at a temperature below about −33° C. and at atmospheric pressure.

11. The process which comprises reacting substantially anhydrous cellulose with an alkali metal in a medium comprising anhydrous liquid ammonia, adding an etherifying agent in amount equal to between about 1 and about 10 equivalents thereof per atom of alkali metal present as cellulosate, and allowing the reaction to proceed until the alkali metal employed is converted to an alkali metal salt.

12. The process which comprises reacting substantially anhydrous cellulose with between about 1 and about 3 equivalents of an alkali metal per anhydro-glucose unit in the cellulose employed in a medium comprising anhydrous liquid ammonia, adding an etherifying agent in amount equal to between about 1 and about 10 equivalents thereof per atom of alkali metal employed in the preparation of the alkali metal cellulosate, and allowing the reaction to proceed until the alkali metal employed is substantially completely converted to an alkali metal salt.

13. The process which comprises reacting substantially anhydrous cellulose with between about 1 and about 3 equivalents of an alkali metal per anhydro-glucose unit in the cellulose employed, in a medium comprising anhydrous liquid ammonia, adding ethyl bromide in amount equal to between about 1 and about 10 equivalents thereof per atom of alkali metal employed in the preparation of the alkali metal cellulosate, and allowing the reaction to proceed until the alkali metal employed is substantially completely converted to alkali metal bromide.

14. The process which comprises reacting substantially anhydrous cellulose with sodium in a medium comprising anhydrous liquid ammonia at a temperature below about −33° C. and at atmospheric pressure, until the sodium has been substantially completely reacted with the cellulose, adding an etherifying agent in amount equal to between about 1 and about 10 equivalents thereof per atom of sodium, and allowing the reaction to proceed until the alkali metal employed is substantially completely converted to the sodium salt of the acid radical in the etherifying agent.

15. The process which comprises reacting substantially anhydrous cellulose with sodium in a medium comprising anhydrous liquid ammonia at a temperature below about −33° C. and at atmospheric pressure, evaporating a major proportion of the ammonia from the alkali metal cellulosate, retaining enough of the ammonia, however, to keep the reaction product moistened therewith, adding an etherifying agent in amount equal to between about 1 and about 10 equivalents thereof per atom of sodium, allowing the reaction to proceed until the sodium is substantially completely converted to the sodium salt of the acid radical in the etherifying agent, and allowing most of the remaining liquid ammonia to evaporate from the reaction mixture during the etherification step.

16. The process for the preparation of a water-insoluble ethyl cellulose which comprises reacting substantially anhydrous cellulose with from 2 to 3 atoms of sodium per glucose unit in the cellulose employed, in a medium comprising anhydrous liquid ammonia, until the sodium is substantially completely reacted, adding an inorganic ester of ethyl alcohol in amount equivalent to from 1 to 10 moles thereof per atom of sodium employed, and allowing the reaction to proceed until the sodium is substantially completely converted to a sodium salt.

17. The process for the preparation of a water-insoluble ethyl cellulose which comprises reacting substantially anhydrous cellulose with from 2 to 3 atoms of sodium per glucose unit in the cellulose employed, in a medium comprising anhydrous liquid ammonia, until the sodium is substantially completely reacted, adding a benzyl halide in amount equivalent to from 1 to 10 moles thereof per atom of sodium employed, and allowing the reaction to proceed until the sodium is substantially completely converted to a sodium halide.

18. The process which comprises reacting partially etherified cellulose with an alkali metal in a medium comprising anhydrous liquid ammonia, the amount of alkali metal employed being stoichiometrically equivalent to the unsubstituted hydroxyl groups present in the partially etherified cellulose, until the alkali metal has substantially completely reacted therewith, adding an etherifying agent in amount equal to between about 1 and about 10 equivalents thereof per atom of alkali metal, and allowing the reaction to proceed until the alkali metal employed is substantially completely converted to the alkali metal salt of the acid radical present in the etherifying agent.

FLOYD C. PETERSON.
ARTHUR J. BARRY.